US012718011B2

(12) United States Patent
Shinde et al.

(10) Patent No.: US 12,718,011 B2
(45) Date of Patent: Aug. 25, 2026

(54) ITERATIVE COMMUNICATION PLAN GENERATION USING LARGE LANGUAGE MODELS

(71) Applicant: Capital One Services, LLC, McLean, VA (US)

(72) Inventors: Swapnil Shinde, Chantilly, VA (US); Isha Chaturvedi, Mountain View, CA (US); Jaime Mantilla, Cranford, NJ (US); Giridharan Iyengar, Ashburn, VA (US)

(73) Assignee: Capital One Services, LLC, McLean, VA (US)

( * ) Notice: Subject to any disclaimer, the term of this patent is extended or adjusted under 35 U.S.C. 154(b) by 155 days.

(21) Appl. No.: 18/820,532

(22) Filed: Aug. 30, 2024

(65) Prior Publication Data

US 2026/0064960 A1 Mar. 5, 2026

(51) Int. Cl.

*G06F 40/20* (2020.01)
*G06F 40/30* (2020.01)
*H04L 51/21* (2022.01)

(52) U.S. Cl.

CPC .............. *G06F 40/20* (2020.01); *G06F 40/30* (2020.01); *H04L 51/21* (2022.05)

(58) Field of Classification Search

CPC ........... G06F 40/20; G06F 40/30; H04L 51/21
See application file for complete search history.

(56) References Cited

U.S. PATENT DOCUMENTS

2025/0094725 A1* 3/2025 Vishnoi ................. G06F 40/284
2025/0110957 A1* 4/2025 Baldua ................ G06F 16/2425
2025/0231937 A1* 7/2025 Karlberg ............ G06F 16/9024

* cited by examiner

*Primary Examiner* — Huyen X Vo
(74) *Attorney, Agent, or Firm* — Harrity & Harrity, LLP

(57) ABSTRACT

In some implementations, a device may receive a plurality of natural language inputs that indicate desired characteristics for a communication plan, where the communication plan is defined by a plurality of plan parameters. The device may generate, in a plurality of iterations and using a large language model, the plurality of plan parameters and a plurality of response outputs relating to the plurality of plan parameters. Each iteration, of the plurality of iterations, may be based on a respective natural language input, of the plurality of natural language inputs, analytics conclusions relating to one or more of the desired characteristics of the communication plan indicated by the respective natural language input, and state information indicating previously-generated plan parameters of previous iterations. The plurality of natural language inputs and the plurality of response outputs may alternate in a conversational format.

20 Claims, 7 Drawing Sheets

User Device
210

200

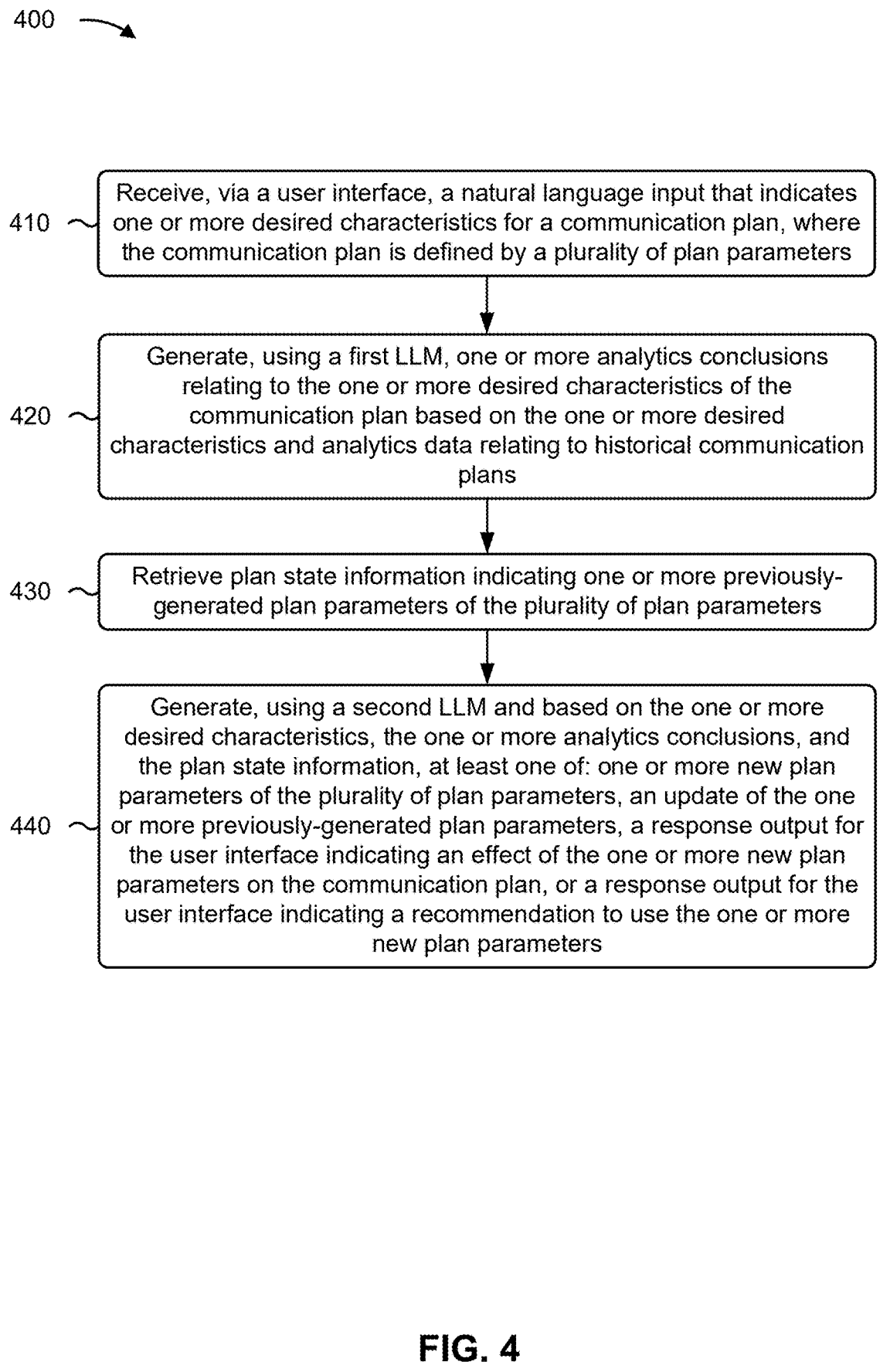

400

410 Receive, via a user interface, a natural language input that indicates one or more desired characteristics for a communication plan, where the communication plan is defined by a plurality of plan parameters 420 Generate, using a first LLM, one or more analytics conclusions relating to the one or more desired characteristics of the communication plan based on the one or more desired characteristics and analytics data relating to historical communication plans 430 Retrieve plan state information indicating one or more previously-generated plan parameters of the plurality of plan parameters 440 Generate, using a second LLM and based on the one or more desired characteristics, the one or more analytics conclusions, and the plan state information, at least one of: one or more new plan parameters of the plurality of plan parameters, an update of the one or more previously-generated plan parameters, a response output for the user interface indicating an effect of the one or more new plan parameters on the communication plan, or a response output for the user interface indicating a recommendation to use the one or more new plan parameters

FIG. 4

ITERATIVE COMMUNICATION PLAN GENERATION USING LARGE LANGUAGE MODELS

BACKGROUND

A device may transmit communications by email, text message, automated phone calls, or the like. In some cases, the device may transmit hundreds, thousands, or even millions of communications over a relatively short period of time. Sometimes, a recipient of a communication may not open, read, answer, or respond to the communication.

SUMMARY

Some implementations described herein relate to a system for iterative communication plan generation using large language models (LLMs). The system may include one or more memories and one or more processors communicatively coupled to the one or more memories. The one or more processors may be configured to receive, via a user interface, a natural language input that indicates one or more desired characteristics for a communication plan, where the communication plan is defined by a plurality of plan parameters. The one or more processors may be configured to generate, using a first LLM, one or more analytics conclusions relating to the one or more desired characteristics of the communication plan based on the one or more desired characteristics and analytics data relating to historical communication plans. The one or more processors may be configured to retrieve plan state information indicating one or more previously-generated plan parameters of the plurality of plan parameters. The one or more processors may be configured to generate, using a second LLM, one or more new plan parameters, of the plurality of plan parameters, based on the one or more desired characteristics, the one or more analytics conclusions, and the plan state information. The one or more processors may be configured to update the plan state information to include the one or more new plan parameters. The one or more processors may be configured to generate, responsive to generation of all of the plurality of plan parameters and using the plan state information, structured data representing the plurality of plan parameters.

Some implementations described herein relate to a method of iterative communication plan generation using LLMs. The method may include receiving, via a user interface, a natural language input that indicates one or more desired characteristics for a communication plan, where the communication plan is defined by a plurality of plan parameters. The method may include generating, using a first LLM, one or more analytics conclusions relating to the one or more desired characteristics of the communication plan based on the one or more desired characteristics and analytics data relating to historical communication plans. The method may include retrieving plan state information indicating one or more previously-generated plan parameters of the plurality of plan parameters. The method may include generating, using a second LLM and based on the one or more desired characteristics, the one or more analytics conclusions, and the plan state information, at least one of: one or more new plan parameters of the plurality of plan parameters, an update of the one or more previously-generated plan parameters, a response output for the user interface indicating an effect of the one or more new plan parameters on the communication plan, or a response output for the user interface indicating a recommendation to use the one or more new plan parameters.

Some implementations described herein relate to a non-transitory computer-readable medium that stores a set of instructions for iterative communication plan generation using an LLM. The set of instructions, when executed by one or more processors of a device, may cause the device to receive a plurality of natural language inputs that indicate desired characteristics for a communication plan, where the communication plan is defined by a plurality of plan parameters. The set of instructions, when executed by one or more processors of the device, may cause the device to generate, in a plurality of iterations and using the LLM, the plurality of plan parameters and a plurality of response outputs relating to the plurality of plan parameters. Each iteration, of the plurality of iterations, may be based on a respective natural language input, of the plurality of natural language inputs, analytics conclusions relating to one or more of the desired characteristics of the communication plan indicated by the respective natural language input, and state information indicating previously-generated plan parameters of previous iterations. The plurality of natural language inputs and the plurality of response outputs may alternate in a conversational format.

BRIEF DESCRIPTION OF THE DRAWINGS

FIG. 4 is a flowchart of an example process associated with iterative communication generation using LLMS, in accordance with some embodiments of the present disclosure.

DETAILED DESCRIPTION

Figure 1A:
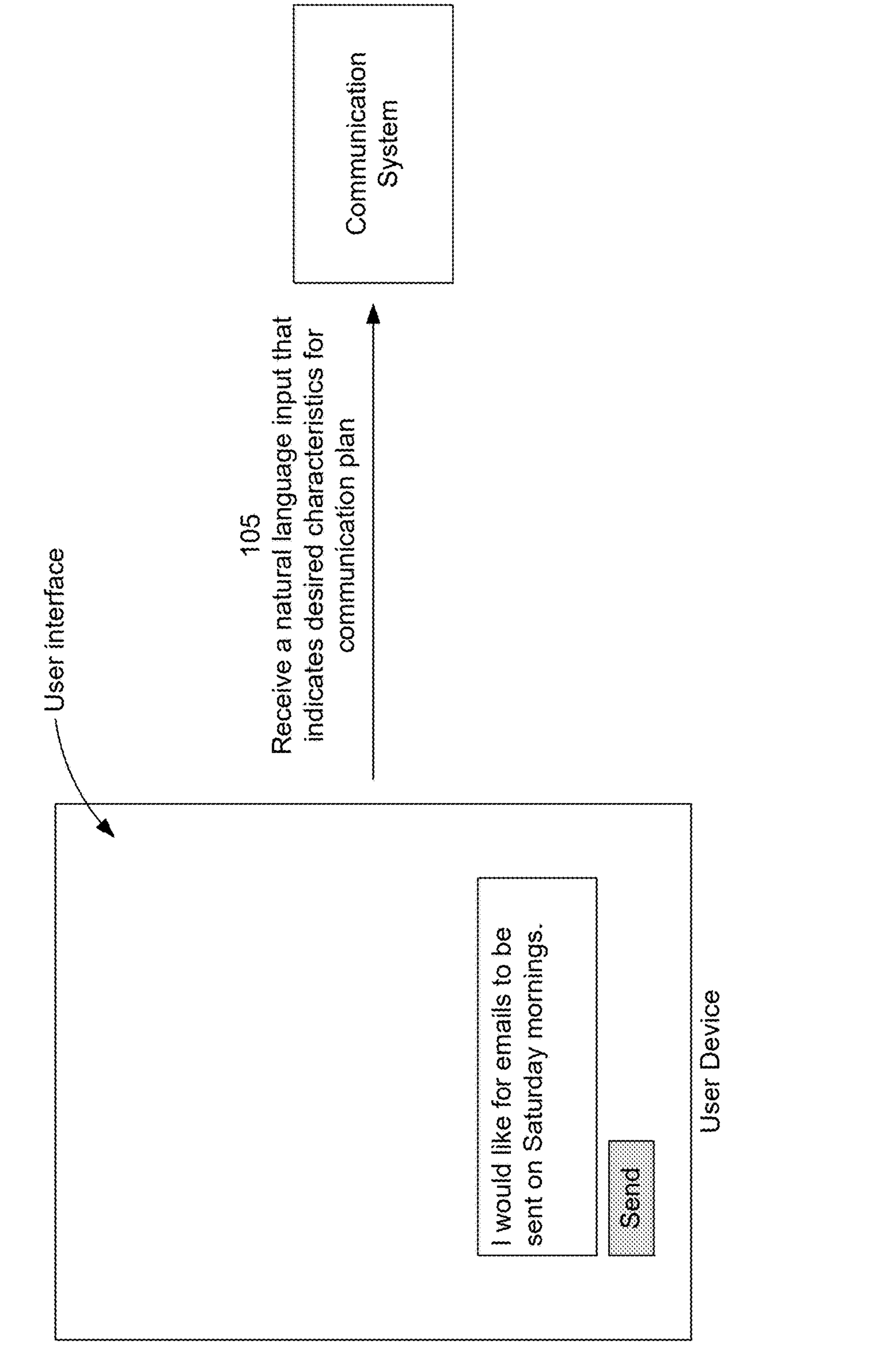
FIGS. 1A-1D are diagrams of an example associated with iterative communication plan generation using LLMs, in accordance with some embodiments of the present disclosure.

The following detailed description of example implementations refers to the accompanying drawings. The same reference numbers in different drawings may identify the same or similar elements.

Communications may be transmitted by email, text message, automated phone calls, or the like. In general, the transmission of a single communication may use minimal computing resources (e.g., memory resources, processor resources, or the like) of the transmitter and minimal resources of a communications network on which the communication is transmitted. However, commonly, an entity may be engaged in operations that call for the transmission of hundreds, thousands, or even millions of communications, which in the aggregate place a significant burden on computing resources and network resources. A communication plan used for communications (e.g., indicating an audience for the communications, a communication channel for the communications, content for the communications, a timing for the communications, or the like) may play a role in whether a recipient engages with the communication (e.g., opens the communication, reads the communication, responds to the communication, or the like). Thus, by transmitting communications using a suboptimal communication plan, significant computing resources and network resources may be expended in an inefficient manner. However, creation of a communication plan is extremely complex, and may need to factor in numerous objectives, goals, metrics, analytics, or the like.

Some implementations described herein relate to a system that can generate an optimized communication plan. The system may generate the communication plan in an iterative manner through artificial intelligence (AI)-based interactions with a user through a user interface. Through these iterative interactions, the system may receive inputs that indicate desired characteristics for a communication plan, and generate plan parameters for the communication plan. The plan parameters that are generated may be based on the desired characteristics indicated through the inputs, as well as previously-generated plan parameters for the communication plan and analytics conclusions (e.g., that are based on historical communication plan data). In this way, the communication plan that is generated is cohesive, robust, and optimized. Thus, communication transmissions, in accordance with the communication plan, may be performed efficiently (e.g., recipients may engage with the communications at higher rates), thereby more efficiently utilizing computing resources and network resources.

FIGS. 1A-1D are diagrams of an example 100 associated with iterative communication plan generation using LLMs. As shown in FIGS. 1A-1D, example 100 includes a communication system and a user device. These devices are described in more detail in connection with FIGS. 2 and 3. An LLM is an AI system designed to understand and generate human-like text. An LLM may use machine learning techniques such as deep learning (e.g., neural networks including transformers), and unsupervised learning methods to predict and generate coherent and contextually relevant text.

The communication system may be associated with an entity engaged in issuing communications (e.g., emails, text messages, push notifications, automated telephone calls, social media posts, and/or postal mail, among other examples) to external parties (e.g., customers or other individuals) in connection with communication campaigns (e.g., marketing campaigns, or the like). A communication campaign may follow a communication plan, as described herein. In some implementations, the communication system may include a generative system that performs generative operations described herein, and an execution system that executes the communication plan, as described herein. In some implementations, the execution system may be separate from the communication system. The user device may also be associated with the entity, and may be used by a user (e.g., an employee of the entity) to generate the communication plan.

The communication plan may be defined by a plurality of plan parameters that indicate a manner in which the communication campaign is to be conducted. For example, the plan parameters may indicate an audience to receive communications (e.g., particular individuals to receive communications, demographic segments to receive communications, or geographic areas in which individuals are to receive communications, among other examples), one or more communication channels for the communications (e.g., website, mobile application, email, text message, push notification, automated telephone call, call center messaging, social media post, chatbot, brick-and-mortar displayed media or messaging, and/or postal mail, among other examples), a content for the communications, a placement for the content (e.g., an email subject, an email body, a webpage sidebar, a webpage footer, or the like), and/or a timing for providing the communications to the audience (e.g., times of day, days of the week, particular dates, particular months, and/or upon particular events, among other examples).

The communication system may generate the communication plan in an iterative manner through AI-based conversation with the user. For example, the AI-based conversation may use an LLM. The user device may include a user interface (e.g., a web browser) through which the user can provide inputs for the LLM and receive outputs from the LLM. In some implementations, the communication system may receive (e.g., from the user device via the user interface) a plurality of natural language inputs that indicate desired characteristics for a communication plan. For example, the communication system may receive a first natural language input from the user device, may process the first natural language input and generate a response output for the user device, may receive a second natural language input from the user device, and so forth, in a conversational manner (e.g., in a question-and-answer manner).

Accordingly, in a plurality of iterations (e.g., of inputs and response outputs) and using the LLM, the communication system may generate the plurality of plan parameters of the communication plan and a plurality of response outputs relating to the plurality of plan parameters (e.g., the result of each iteration is one or more plan parameters and/or a response output). For example, the natural language inputs and the response outputs may alternate in a conversational format. Each iteration may be based on a respective natural language input, analytics conclusions relating to one or more of the desired characteristics that are indicated by the respective natural language input (as described below), and/or plan state information indicating previously-generated plan parameters of previous iterations, if any (as described below).

Example 100 is described below in terms of a single iteration of the plurality of iterations for plan parameter generation. In some implementations, this single iteration may be after an initial iteration, and therefore one or more previously-generated plan parameters (e.g., generated by one or more previous iterations) may be stored in plan state information. The plan state information may be stored in a database implemented by, or accessible to, the communication system. The plan state information facilitates state continuity among different iterations.

As shown in FIG. 1A, and by reference number 105, the communication system may receive, from the user device via the user interface, a natural language input that indicates one or more desired characteristics for the communication plan. The natural language input may be text indicating a description of the desired characteristic(s) for the communication plan. For example, the desired characteristics for the communication plan may indicate one or more of an objective, a goal, a success metric (e.g., a metric indicative of the communication plan being successful), a guardrail metric (e.g., a metric that the communication plan should not violate), a responsible party, department, or group for the communication plan, an audience for the communication plan (e.g., one or more attributes associated with a target audience), a content (which may include different types of content for different communication channels or different audience segments), a communication channel, a placement (e.g., an email subject line, a web page footer, or the like), a timing, metrics or areas to be optimized, and/or governance or ethical objectives, among other examples. As an example, the natural language input may indicate: "I would like for emails to be sent on Saturday mornings." In this example, the natural language input indicates desired characteristics of the communication plan, such as an email communication channel and Saturday mornings as a timing for the emails.

Figure 1B:
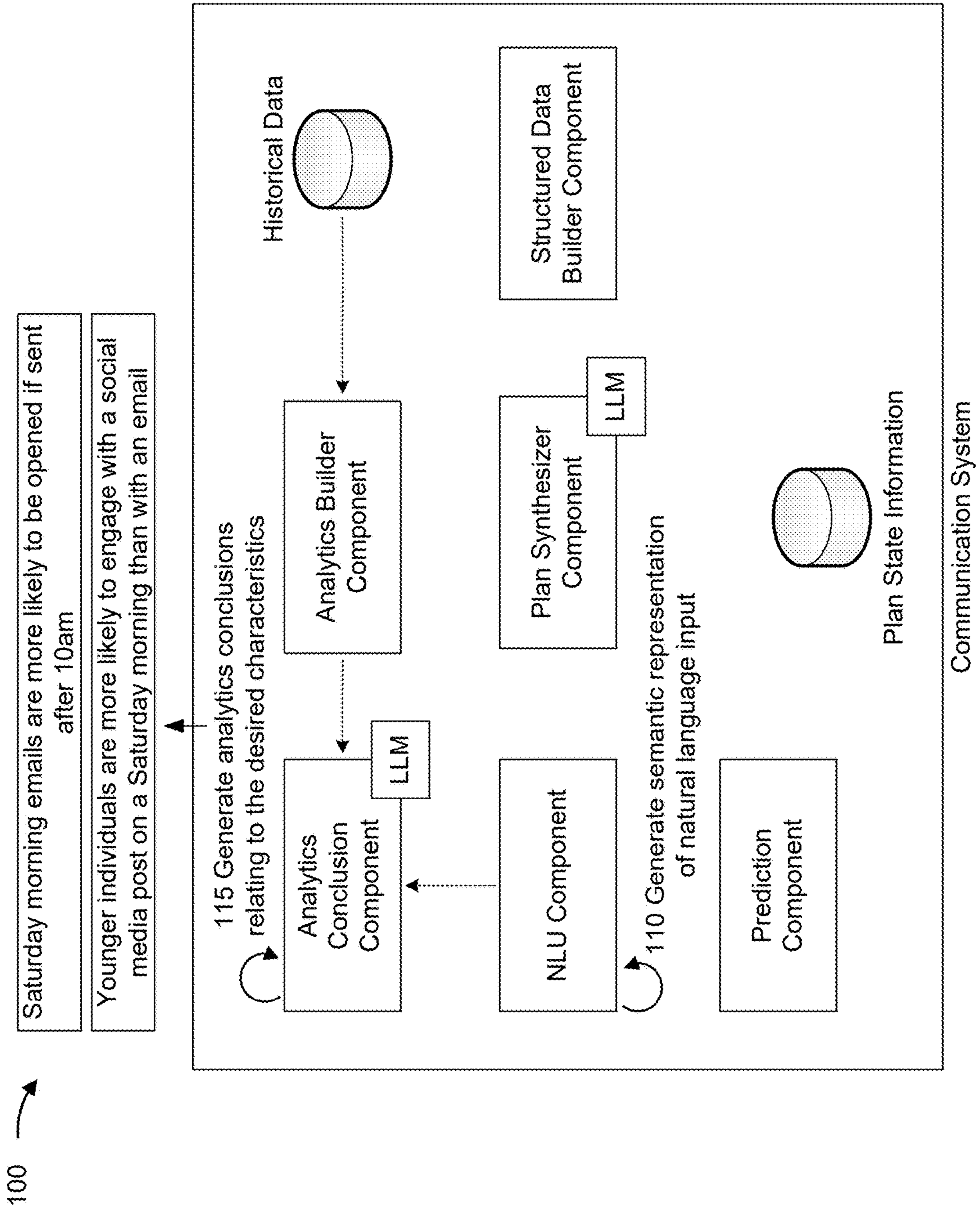

As shown in FIG. 1B. and by reference number 110, the communication system may generate a semantic representation of the natural language input (e.g., using a natural language understanding (NLU) component). For example, the communication system may generate the semantic representation using an NLU technique on the natural language input. The semantic representation may include a structured representation of the natural language input that indicates a meaning of the natural language input, such as word embeddings. For example, the semantic representation may extract the desired characteristics of the communication plan from the natural language input. In some implementations, the communication system may use the semantic representation for further processing tasks associated with the natural language input. Alternatively, the communication system may use the natural language input itself for further processing tasks. In some implementations, one or more LLMs described herein may be configured to generate the semantic representation in connection with generating an output.

As shown by reference number 115, the communication system may generate one or more analytics conclusions relating to the one or more desired characteristics of the communication plan (e.g., using an analytics conclusion component). For example, the analytics conclusion(s) may be based on the desired characteristic(s) and/or analytics data. An analytics conclusion may indicate a summary or other characterization of an insight, relating to the desired characteristic(s), derived from the analytics data. For example, with desired characteristics of the communication plan being an email communication channel and Saturday mornings as a timing for the communications, an analytics conclusion may indicate that Saturday morning emails are more likely to be opened if sent after 10 am, or may indicate that younger individuals are more likely to engage with a social media post on a Saturday morning than with an email, among other examples.

In some implementations, the communication system, or another system, may build the analytics data (e.g., using machine learning or statistical models) prior to the iterations for generating the plan parameters. For example, building the analytics data may include retrieving historical data (e.g., from a database or other data store), and processing the historical data to generate the analytics data. The processing may include normalizing the historical data, aggregating the historical data, extracting or computing metrics from the historical data, or the like. The historical data may be structured data. The historical data may relate to historical communication plans, such as the plan parameters of historical communication plans, user engagement data in connection with historical communications made in accordance with the historical communication plans, production data, or the like. Thus, the analytics data may relate to the historical communications plans.

The communication system may generate the analytics conclusion(s) using an LLM (which may be referred to herein as the "first LLM" or the "analytics LLM"). In some implementations, the analytics LLM may be fine-tuned for analytics conclusions generation (e.g., using the historical data and/or the analytics data, among other examples, as training data). Therefore, an analytics conclusion may be expressed as natural language text. In some implementations, the communication system may generate a semantic representation of the natural language text, in a similar manner as described above. To use the analytics LLM, the communication system may input a prompt (e.g., a predefined prompt) to the analytics LLM, and the prompt may indicate the natural language input or the semantic representation thereof (e.g., which indicates the desired characteristic(s)) and/or analytics data.

Figure 1C:
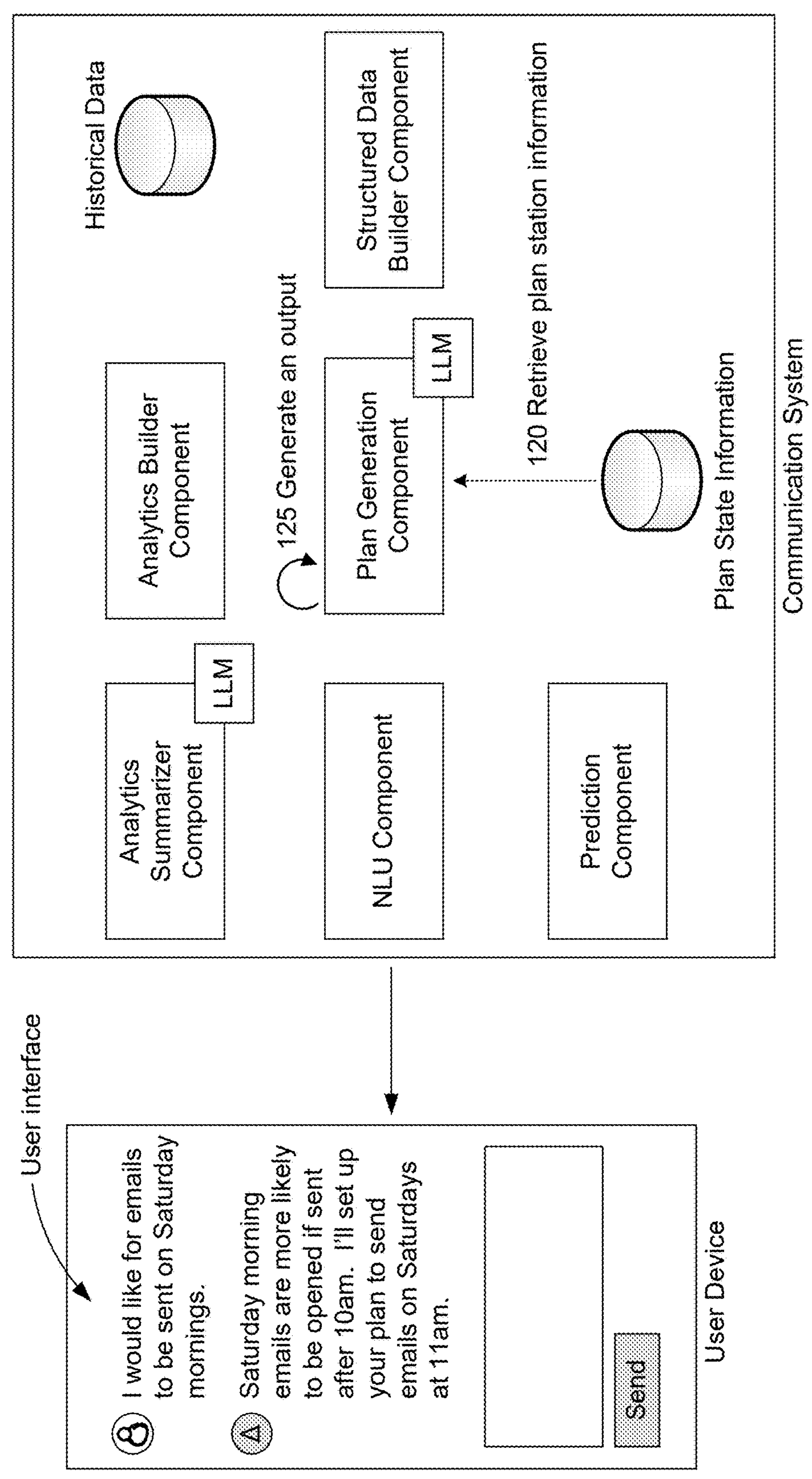

As shown in FIG. 1C, and by reference number 120, the communication system may retrieve plan state information relating to previous iterations (if any). The plan state information may indicate one or more previously-generated plan parameters for the communication plan. For example, a previous plan parameter may indicate that an audience for the communications are individuals 20-25 years old, or may indicate a particular content for the communications. As described herein, the plan state information enables the communication system to keep track of plan parameters across different iterations. The communication system may retrieve the plan state information from a database or other data store.

As shown by reference number 125, the communication system may generate an output (e.g., using a plan generation component) based on the desired characteristic(s) of the communication plan, the one or more analytics conclusions (e.g., as natural language or a semantic representation thereof), and/or the plan state information. In some implementations, the output may indicate one or more new plan parameters for the communication plan. For example, a new plan parameter may be in accordance with a desired characteristic, while taking into account the analytics conclusion(s) and the plan state information. As an example, a new plan parameter for the communication plan may indicate that communications are to be sent at 11 am (e.g., in accordance with the desired characteristics of sending emails on Saturday morning, and the analytic conclusion that emails sent after 10 am are more likely to be opened), or may indicate that communications are to be additionally provided via a social media channel (e.g., in accordance with the desired characteristics of sending emails on Saturday morning, the analytic conclusion that younger individuals are more likely to engage with a social media post on a Saturday morning than with an email, and the previously-generated plan parameter that the audience for the communications are individuals 20-25 years old).

Additionally, or alternatively, the output may indicate an update of a previously-generated plan parameter. For example, the update of the previously-generated plan parameter may be based on the new plan parameter(s). In other words, as each iteration generates new plan parameters, plan parameters generated in previous iterations may be updated so that the overall communication plan remains compatible. As an example, a previously-generated plan parameter of the particular content for the communications, may be updated to include a link to a social media post (e.g., in accordance with the new plan parameter indicating that communications are to be additionally provided via a social media channel).

Additionally, or alternatively, the output may indicate a response output (e.g., for the user interface) indicating an effect of the one or more new plan parameters on the communication plan. For example, the response output may indicate how a particular configuration for the communication plan, that uses the new plan parameters, would impact one or more metrics (e.g., page views, clicks, in-person visits, or the like). Furthermore, the response output may request further input on whether to use or modify the new plan parameters (e.g., in view of the effect of the new plan parameters on the communication plan). Accordingly, the communication system may receive, from the user device via the user interface, an additional natural language input responsive to the response output (thereby beginning a new iteration).

Additionally, or alternatively, the output may indicate a response output (e.g., for the user interface) indicating a recommendation to use the one or more new plan parameters. For example, the response output may indicate the recommendation to use the one or more new plan parameters (e.g., which may also indicate a reasoning for the recommendation), and may request further input on the recommendation. Accordingly, the communication system may receive, from the user device via the user interface, an additional natural language input responsive to the response output (thereby beginning a new iteration). In some implementations, the output may include a hyperlink or other pointer to an electronic document (e.g., a web page) indicating additional details relating to the output.

The communication system may generate the output using an LLM (which may be referred to herein as the "second LLM" or the "plan parameters LLM"). In some implementations, the plan parameters LLM may be fine-tuned for plan parameter generation (e.g., using historical communication plan data, among other examples, as training data). Thus, the analytics LLM and the plan parameters LLM may have different training, may have different configurations, or the like. To use the plan parameters LLM, the communication system may input a prompt (e.g., a predefined prompt) to the plan parameters LLM, and the prompt may indicate the natural language input or the semantic representation thereof (e.g., which indicates the desired characteristic(s)), the one or more analytics conclusions (e.g., as natural language or a semantic representation thereof), and/or the plan state information.

Figure 1D:
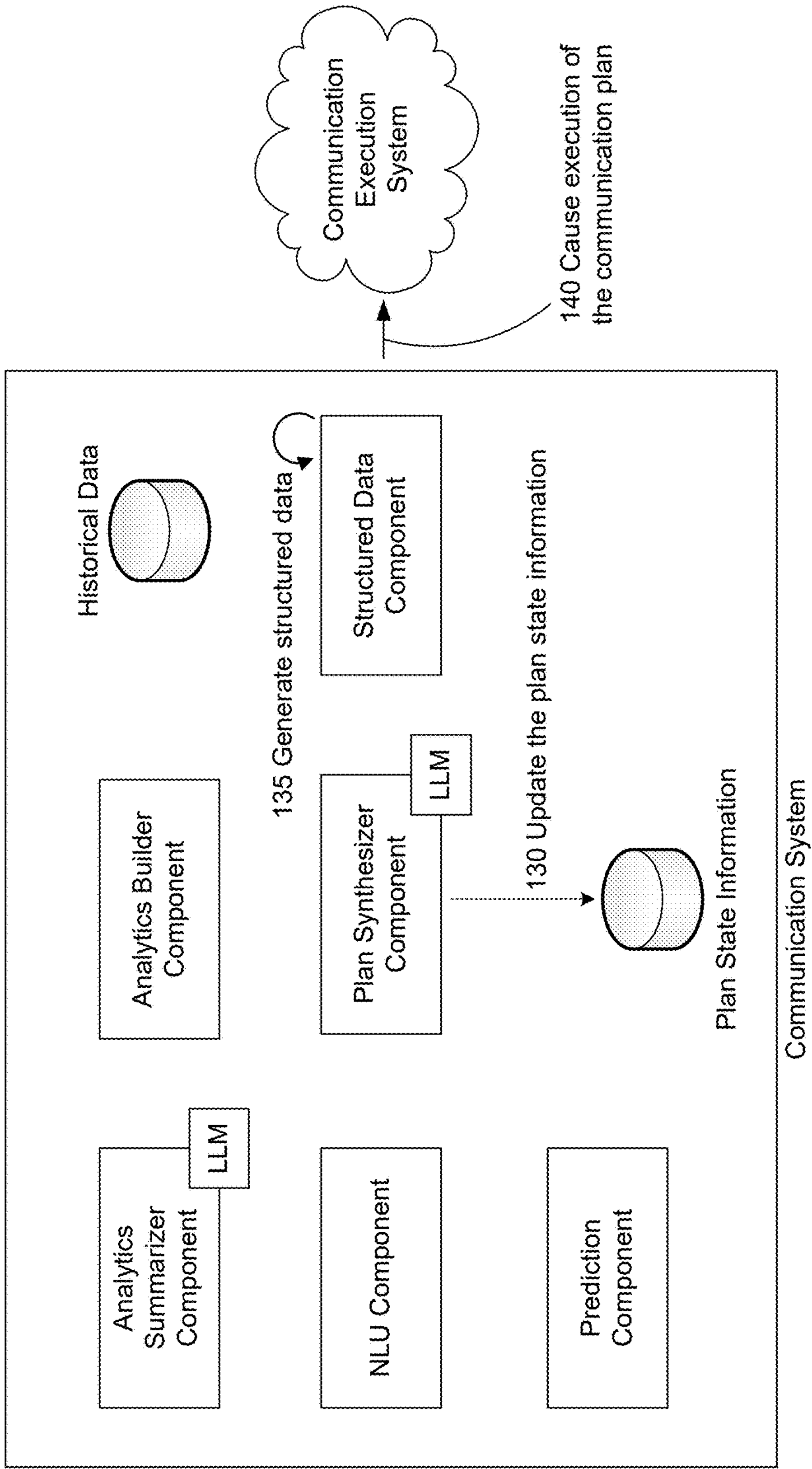

As shown in FIG. 1D, and by reference number 130, the communication system may update the plan state information. For example, the communication system may update the plan state information in accordance with the output. As an example, the communication system may update the plan state information to include the new plan parameter(s) (e.g., responsive to generating the new plan parameter(s)). As another example, the communication system may update the plan state information in accordance with the update to the previously-generated plan parameter(s) (e.g., responsive to generating the update to the previously-generated plan parameter(s)). In some implementations, the communication system may update the plan state information by issuing one or more database queries to the database that stores the plan state information.

In some implementations, the communication system may generate (e.g., for output via the user interface) a prediction of an outcome to result from the previous plan parameters and the new plan parameters. For example, the prediction may relate to an outcome to result from execution of the communication plan that uses the previous plan parameters and the new plan parameters. In particular, the prediction may relate to how one or more metrics (e.g., user engagement metrics, such as click-through rate) are to be affected by execution of the communication plan. In some implementations, the communication system may generate the prediction based on historical engagement data (e.g., in connection with historical communications made in accordance with the historical communication plans). For example, the communication system may generate the prediction using a machine learning model trained (e.g., using historical engagement data) to output the prediction based on an input of plan parameters of the communication plan.

The communication system may perform multiple sequential iterations, in a similar manner as described above, to generate additional plan parameters and/or update previously-generated plan parameters. As described herein, the additional and/or updated plan parameters may be stored in the plan state information to maintain a state of the communication plan across the multiple iterations. The multiple iterations may proceed in a conversational manner until all of the plan parameters for the communication plan have been generated.

As shown by reference number 135, the communication system may generate structured data (e.g., a data object) representing the plurality of plan parameters (e.g., using a structured data component). For example, the communication system may generate the structured data responsive to generation of all plan parameters. Alternatively, the communication system may generate the structured data incrementally in connection with the iterations, and the communication system may complete the structured data after generation of all plan parameters. The communication system may retrieve the plan state information, and may generate the structured data using the plan state information (e.g., a schema for the structured data may be configured to indicate the plan state information). The structured data may be in a JavaScript object notation (JSON) format, an extensible markup language (XML) format, or another format that can be used to represent communication plans in a standardized manner. For example, the communication system may generate a JSON document (e.g., a JSON file) indicating the plan parameters. In some implementations, the communication system may store the structured data (e.g., the JSON file) in a data store until the communication plan is ready for execution (e.g., the communication plan may undergo quality assurance review, validation, or other testing before the communication plan is ready for execution).

As shown by reference number 140, the communication system may cause execution of the communication plan using the structured data representing the plan parameters. For example, the communication system may provide the communication plan to a communication execution system (e.g., that is internal or external to the communication system) for execution, or the communication system may execute the communication plan. Execution of the communication plan may cause communications to be transmitted, displayed, or otherwise provided to a plurality of individuals in accordance with the communication plan.

In this way, the communication plan that is generated is cohesive, robust, and optimized. Thus, communication transmissions, in accordance with the communication plan, may be performed efficiently (e.g., recipients may engage with the communications at higher rates), thereby more efficiently utilizing computing resources and network resources used for the transmissions.

As indicated above, FIGS. 1A-1D are provided as an example. Other examples may differ from what is described with regard to FIGS. 1A-1D.

Figure 2:
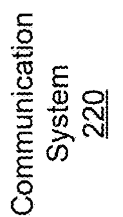
FIG. 2 is a diagram of an example environment in which systems and/or methods described herein may be implemented, in accordance with some embodiments of the present disclosure.
Figure 2:
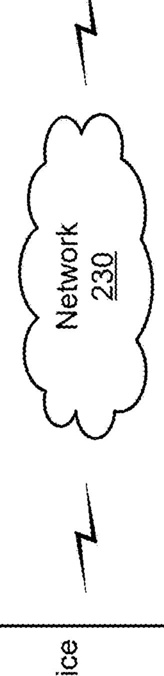

FIG. 2 is a diagram of an example environment 200 in which systems and/or methods described herein may be implemented. As shown in FIG. 2, environment 200 may include a user device 210, a communication system 220, and a network 230. Devices of environment 200 may interconnect via wired connections, wireless connections, or a combination of wired and wireless connections.

The user device 210 may include one or more devices capable of receiving, generating, storing, processing, and/or providing information associated with iterative communication plan generation, as described elsewhere herein. The user device 210 may include a communication device and/or a computing device. For example, the user device 210 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The communication system 220 may include one or more devices capable of receiving, generating, storing, processing, providing, and/or routing information associated with iterative communication plan generation, as described elsewhere herein. The communication system 220 may include a communication device and/or a computing device. For example, the communication system 220 may include a server, such as an application server, a client server, a web server, a database server, a host server, a proxy server, a virtual server (e.g., executing on computing hardware), or a server in a cloud computing system. In some implementations, the communication system 220 may include computing hardware used in a cloud computing environment.

The network 230 may include one or more wired and/or wireless networks. For example, the network 230 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 230 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
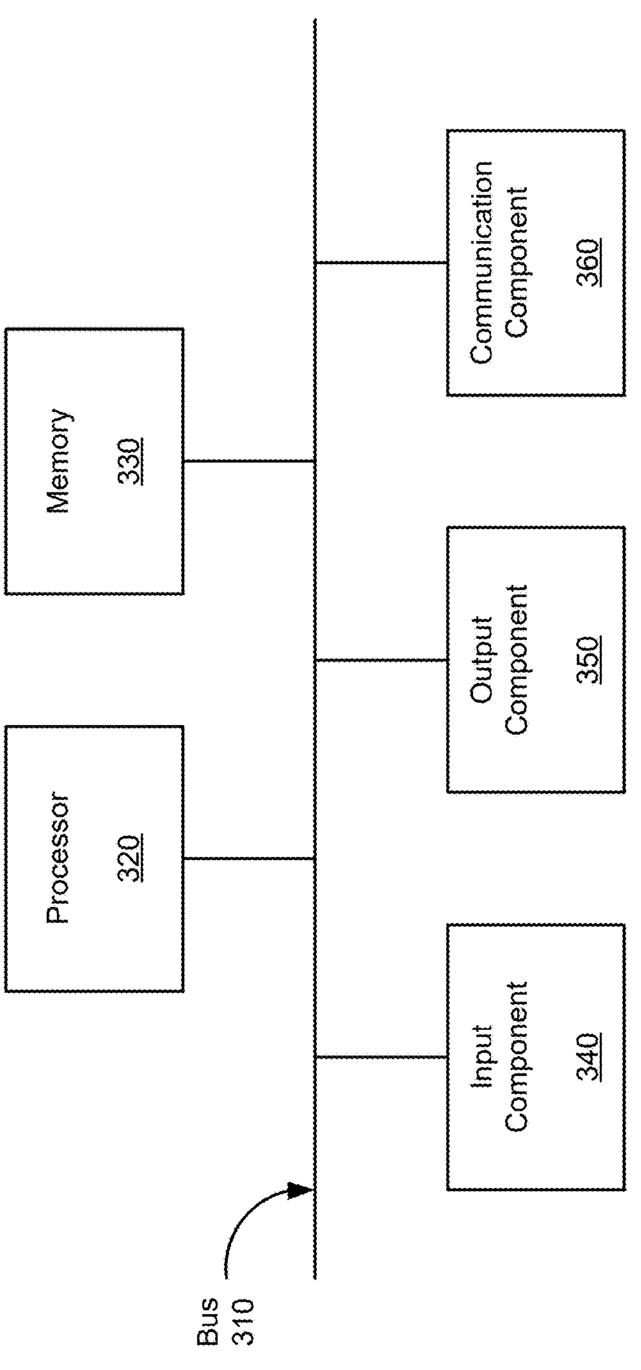
FIG. 3 is a diagram of example components of a device associated with iterative communication generation using LLMs, in accordance with some embodiments of the present disclosure.

FIG. 3 is a diagram of example components of a device 300 associated with iterative communication generation using LLMs. The device 300 may correspond to the user device 210 and/or the communication system 220. In some implementations, the user device 210 and/or the communication system 220 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 associated with iterative communication generation using LLMs.

In some implementations, one or more process blocks of FIG. 4 may be performed by the communication system 220. In some implementations, one or more process blocks of FIG. 4 may be performed by another device or a group of devices separate from or including the communication system 220, such as the user device 210. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include receiving, via a user interface, a natural language input that indicates one or more desired characteristics for a communication plan, where the communication plan is defined by a plurality of plan parameters (block 410). For example, the communication system 220 (e.g., using processor 320, memory 330, input component 340, and/or communication component 360) may receive, via a user interface, a natural language input that indicates one or more desired characteristics for a communication plan, as described above in connection with reference number 105 of FIG. 1A. As an example, the natural language input may be text indicating a description of the desired characteristic(s) for the communication plan, such as one or more of an objective, a goal, a success metric, a guardrail metric, a responsible party, department, or group for the communication plan, an audience for the communication plan, a content, a communication channel, a placement, a timing, metrics or areas to be optimized, and/or governance or ethical objectives, among other examples.

As further shown in FIG. 4, process 400 may include generating, using a first LLM, one or more analytics conclusions relating to the one or more desired characteristics of the communication plan based on the one or more desired characteristics and analytics data relating to historical communication plans (block 420). For example, the communication system 220 (e.g., using processor 320 and/or memory 330) may generate, using a first LLM, one or more analytics conclusions relating to the one or more desired characteristics of the communication plan based on the one or more desired characteristics and analytics data relating to historical communication plans, as described above in connection with reference number 115 of FIG. 1B. As an example, an analytics conclusion may indicate a summary or other characterization of an insight, relating to the desired characteristic(s).

As further shown in FIG. 4, process 400 may include retrieving plan state information indicating one or more previously-generated plan parameters of the plurality of plan parameters (block 430). For example, the communication system 220 (e.g., using processor 320 and/or memory 330) may retrieve plan state information indicating one or more previously-generated plan parameters of the plurality of plan parameters, as described above in connection with reference number 120 of FIG. 1C. As an example, the previously-generated plan parameters may indicate a state of the communication plan across one or more previous iterations for communication plan generation.

As further shown in FIG. 4, process 400 may include generating, using a second LLM and based on the one or more desired characteristics, the one or more analytics conclusions, and the plan state information, at least one of: one or more new plan parameters of the plurality of plan parameters, an update of the one or more previously-generated plan parameters, a response output for the user interface indicating an effect of the one or more new plan parameters on the communication plan, or a response output for the user interface indicating a recommendation to use the one or more new plan parameters (block 440). For example, the communication system 220 (e.g., using processor 320 and/or memory 330) may generate, using a second LLM and based on the one or more desired characteristics, the one or more analytics conclusions, and the plan state information, at least one of: one or more new plan parameters of the plurality of plan parameters, an update of the one or more previously-generated plan parameters, a response output for the user interface indicating an effect of the one or more new plan parameters on the communication plan, or a response output for the user interface indicating a recommendation to use the one or more new plan parameters, as described above in connection with reference number 125 of FIG. 1C. As an example, a new plan parameter may be in accordance with a desired characteristic, while taking into account the analytics conclusion(s) and the plan state information.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1D. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for iterative communication plan generation using large language models (LLMs), the system comprising:

one or more memories; and one or more processors, communicatively coupled to the one or more memories, configured to:

receive, via a user interface, a natural language input that indicates one or more desired characteristics for a communication plan, wherein the communication plan is defined by a plurality of plan parameters;

generate, using a first LLM, one or more analytics conclusions relating to the one or more desired characteristics of the communication plan based on the one or more desired characteristics and analytics data relating to historical communication plans;

retrieve plan state information indicating one or more previously-generated plan parameters of the plurality of plan parameters;

generate, using a second LLM, one or more new plan parameters, of the plurality of plan parameters, based on the one or more desired characteristics, the one or more analytics conclusions, and the plan state information;

update the plan state information to include the one or more new plan parameters; and generate, responsive to generation of all of the plurality of plan parameters and using the plan state information, structured data representing the plurality of plan parameters.

2. The system of claim 1, wherein the one or more processors are further configured to:

cause execution of the communication plan using the structured data representing the plurality of plan parameters.

3. The system of claim 1, wherein the one or more processors, to generate, using the second LLM, the one or more new plan parameters, are configured to:

generate, using the second LLM, the one or more new plan parameters and an update of the one or more previously-generated plan parameters, wherein the update of the one or more previously-generated plan parameters is based on the one or more new plan parameters.

4. The system of claim 1, wherein the one or more processors, to generate, using the second LLM, the one or more new plan parameters, are configured to:

generate, using the second LLM, a response output for the user interface indicating an effect of the one or more new plan parameters on the communication plan; and receive, via the user interface, an additional natural language input responsive to the response output.

5. The system of claim 1, wherein the one or more processors are further configured to:

generate, using the second LLM, a response output for the user interface indicating a recommendation to use the one or more new plan parameters; and receive, via the user interface, an additional natural language input responsive to the response output.

6. The system of claim 1, wherein the one or more processors are further configured to:

generate, for output via the user interface, a prediction of an outcome to result from the one or more previously-generated plan parameters and the one or more new plan parameters.

7. The system of claim 1, wherein the one or more processors are further configured to:

generate a semantic representation of the natural language input using a natural language understanding technique on the natural language input, wherein at least one of the first LLM or the second LLM is to use the semantic representation as an indication of the one or more desired characteristics.

8. The system of claim 1, wherein the first LLM is a fine-tuned LLM for analytics conclusions generation, and the second LLM is a fine-tuned LLM for plan parameter generation.

9. The system of claim 1, wherein the plurality of plan parameters include two or more of:

an audience to receive communications, one or more communication channels for the communications, a content for the communications, a placement for the content, or a timing for providing the communications to the audience.

10. The system of claim 1, wherein the one or more processors, to receive the natural language input and to generate the one or more new plan parameters, are configured to:

receive the natural language input and generate the one or more new plan parameters in connection with an iteration, of a plurality of iterations for plan parameter generation.

11. A method of iterative communication plan generation using large language models (LLMs), comprising:

receiving, via a user interface, a natural language input that indicates one or more desired characteristics for a communication plan, wherein the communication plan is defined by a plurality of plan parameters;

generating, using a first LLM, one or more analytics conclusions relating to the one or more desired characteristics of the communication plan based on the one or more desired characteristics and analytics data relating to historical communication plans;

retrieving plan state information indicating one or more previously-generated plan parameters of the plurality of plan parameters; and generating, using a second LLM and based on the one or more desired characteristics, the one or more analytics conclusions, and the plan state information, at least one of:

one or more new plan parameters of the plurality of plan parameters, an update of the one or more previously-generated plan parameters, a response output for the user interface indicating an effect of the one or more new plan parameters on the communication plan, or a response output for the user interface indicating a recommendation to use the one or more new plan parameters.

12. The method of claim 11, further comprising:

updating the plan state information to include the one or more new plan parameters, responsive to generating the one or more new plan parameters.

13. The method of claim 11, further comprising:

updating the plan state information in accordance with the update to the one or more previously-generated plan parameters, responsive to generating the update to the one or more previously-generated plan parameters.

14. The method of claim 11, further comprising:

generating, responsive to generation of all of the plurality of plan parameters and using the plan state information, structured data representing the plurality of plan parameters; and causing execution of the communication plan using the structured data representing the plurality of plan parameters.

15. The method of claim 11, further comprising:

generating, for output via a user interface, a prediction of an outcome to result from the one or more previously-generated plan parameters and the one or more new plan parameters, responsive to generating the one or more new plan parameters.

16. A non-transitory computer-readable medium storing a set of instructions for iterative communication plan generation using a large language model (LLM), the set of instructions comprising:

one or more instructions that, when executed by one or more processors of a device, cause the device to:

receive a plurality of natural language inputs that indicate desired characteristics for a communication plan, wherein the communication plan is defined by a plurality of plan parameters; and generate, in a plurality of iterations and using the LLM, the plurality of plan parameters and a plurality of response outputs relating to the plurality of plan parameters, wherein each iteration, of the plurality of iterations, is based on a respective natural language input, of the plurality of natural language inputs, analytics conclusions relating to one or more of the desired characteristics of the communication plan indicated by the respective natural language input, and state information indicating previously-generated plan parameters of previous iterations, and wherein the plurality of natural language inputs and the plurality of response outputs alternate in a conversational format.

17. The non-transitory computer-readable medium of claim 16, wherein the plurality of response outputs includes a response output indicating an effect of one or more plan parameters, of the plurality of plan parameters, on the communication plan.

18. The non-transitory computer-readable medium of claim 16, wherein the plurality of response outputs includes a response output indicating a recommendation to use one or more plan parameters of the plurality of plan parameters.

19. The non-transitory computer-readable medium of claim 16, wherein the plurality of plan parameters include:

an audience to receive communications, one or more communication channels for the communications, a content for the communications, a placement for the content, and a timing for providing the communications to the audience.

20. The non-transitory computer-readable medium of claim 16, wherein the one or more instructions, when executed by the one or more processors, further cause the device to:

cause execution of the communication plan in accordance with the plurality of plan parameters.

* * * * *